United States Patent [19]

Montaigne

[11] Patent Number: 5,309,619
[45] Date of Patent: May 10, 1994

[54] MULTI-FUNCTION POWER SHEAR MACHINES

[76] Inventor: Michel Montaigne, 112 Greenbrier Ct., Aptos, Calif. 95003

[21] Appl. No.: 836,033

[22] Filed: Feb. 14, 1992

[51] Int. Cl.$^5$ .......................... B21D 5/01; B23P 23/00
[52] U.S. Cl. ........................................ 29/560; 72/324; 72/464; 83/461
[58] Field of Search .................. 29/560; 72/446, 448, 72/324, 464; 83/698, 461; 483/28, 29

[56] References Cited

U.S. PATENT DOCUMENTS

| | | | |
|---|---|---|---|
| 3,616,525 | 11/1971 | Barthel | 29/560 |
| 3,875,655 | 4/1975 | Gerlach | 29/560 |
| 4,506,433 | 3/1985 | Gingras | 29/560 |
| 4,646,420 | 3/1987 | Ebrahimian | 29/560 |
| 4,738,018 | 4/1988 | Ebrahimian | 29/560 |

*Primary Examiner*—Z. R. Bilinsky
*Attorney, Agent, or Firm*—Armstrong, Westerman, Hattori, McLeland & Naughton

[57] ABSTRACT

A power shear machine for processing metal in sheet or plate form. The machine comprises a table base, and a cross-beam both secured between two side members in order to form a part of the machine frame; a shear made of a bottom blade cooperating with a vertically sliding top blade; a vertically sliding hold-down in front of the top blade; and a device for controlling the vertical sliding displacements of the top blade and hold-down. The power shear includes the hold-down which is made of two separate parts, each supporting one of two mating tools on facing sides thereof, and a device for temporarily locking together the parts.

12 Claims, 4 Drawing Sheets

MULTI-FUNCTION POWER SHEAR MACHINES

BACKGROUND OF THE INVENTION

1. Field of the Invention

This invention generally relates to power shears made of assembled weldments or castings, wherein a table base and a cross-beam secured between two side members form an essential part of a machine frame. A bottom blade is mounted on the back of the table base and cooperating with a vertically sliding top blade which lateral edges are guided through grooves provided on the face of each side member. A hold-down also vertically slides through grooves in the side members, in front of the top blade and therefore on top of the table base, and a means induces the top blade and hold-down to slide up and down independent of each other.

2. Description of the Relevant Art

Conventional shears presently on the market are limited to shearing and cannot perform other tasks. When hydraulically operated, the conventional shears require separate pumps for shearing and hold-down.

SUMMARY OF THE INVENTION

One of the objectives of this invention is therefore to provide a shear of the type as specified heretofore which is capable of performing several other tasks, in addition to shearing, as for example, forming, punching, bending or stamping metal or the like.

Another objective of this invention is to use a single pump for the machine to shear and to perform all the other operations, as stated above, and for the machine to have only one table base for shearing and performing all other metal fabricating operations.

Still another object of this invention is to produce a power shear as simple and economical to manufacture as possible, without complicated hydraulic circuitries or electronic controls.

These and other objects of this invention will become apparent, as the possible use of off-the-shelf standard parts are achieved in a power shear machine of the type heretofore specified, where the hold-down which is made of two superimposed separate parts each supporting a tool on facing sides thereof, and a means for temporarily locking the two separate parts is provided.

The above-described structural arrangement of this invention allows for other operations to be performed by the hold-down, by e.g., inserting a metal part between the two unlocked separate parts so that its downward motion forcing against each other the two tools produces a corresponding deforming operation on the metal part inserted therebetween. Furthermore, when the two separate parts of the hold-down are temporarily locked together, it can be used to maintain a metal part on the table base.

With the structural arrangement of this invention wherein the hold-down includes two separate parts, this invention includes a tool having a male tool die for forming, cutting, bending, shaping, punching or notching, and the other one thereof is a corresponding female tool die for power shear for executing other metal fabricating operations of forming, cutting, bending, shaping, punching or notching. Preferably, the female tool die is inserted onto a top face of the hold-down bottom part, and the male tool die is fastened to a bottom face of the hold-down top part.

In a preferred embodiment of this invention, the means for temporarily locking together both hold-down parts include no less than two locking tools, each being equipped with protruding studs for insertion in corresponding drilled holes at each of the top and bottom hold-down parts. In order to assemble and lock together these two parts, it is then only necessary to bring the two in contact with each other and insert the locking tool studs into the corresponding holes of the hold-down parts. The hold-down is then in a single structural entity ready to be used for maintaining material onto the table base, as with conventional power shears.

Top blade and hold-down vertical displacements can be accomplished by mechanical means as with cams and levers. However, in a preferred embodiment of this invention, the displacements are carried out by the action of a hydraulic cylinder actuated in their aggregate by a simple hydraulic pump. Each top blade and hold-down is actuated by a pair of cylinder, preferably located near the two side members.

An intermediary cylinder is mounted in series between the two actuating cylinders of each pair in order to constitute the shear actuation arrangement and the hold-down actuation arrangement. Subsequent to their connection in series and provided all cylinders at each actuation arrangement are identical in all aspects, upon activation, the intermediary cylinders have the same displacement as the two cylinders to which they are in series with, but in the opposite direction, and can possibly be used to actuate other metal fabricating operation.

As for the control of the cylinders, the two actuation arrangements specified herein are mounted within a hydraulic main circuitry fed by a pump. With a hydraulic selector being mounted in between the main circuitry and shear actuation arrangement, depending upon a closed or open condition existing at the hydraulic selector, pump flow is only to activate the hold-down or both the shear and hold-down actuation arrangements.

Preferably, the hydraulic selector includes a two-way poppet valve mounted in series with a pressure-controlled valve adjusted to open above a pre-selected pressure in order to regulate hold-down force, and a poppet check valve mounted parallel to the two-way poppet valve and the pressure controlled valve.

The above-described structural arrangement provides for shear cylinders to be actuated only after sufficient force is applied to a material on the table by the hold-down. The purpose for the poppet check valve is, when the shear is raised up, to allow returning hydraulic fluid so as to bypass the two other components of the hydraulic selector. A simple manual spool position shifting of the two-way poppet valve changes machine mode, the structural arrangement of which can be used either as a shear or for other operations.

The shear and/or hold-down up and down change in position is controlled by a main valve interposed between a main circuitry and the pump, whereas the main valve having three positions, pump flow being in one of these positions, is directed to tank; thereby, neutralizing the main circuitry, while in the other two flows are directed at either end of the main circuitry and thus, at either end of each shear and hold-down actuation arrangement.

In order to protect the various hydraulic components and the pump, in particular, against undesired pressure surge, a poppet relief valve is mounted down stream from the pump, preferably close to it.

Finally, in order to compensate for always present leakages, replenishing valves are mounted on the two abovedescribed actuation arrangements and on each side of each intermediary cylinder.

These and other features of the invention will be understood upon reading of the following description along with the drawings.

DETAILED DESCRIPTION OF THE PREFERRED EMBODIMENTS

Figure 1:
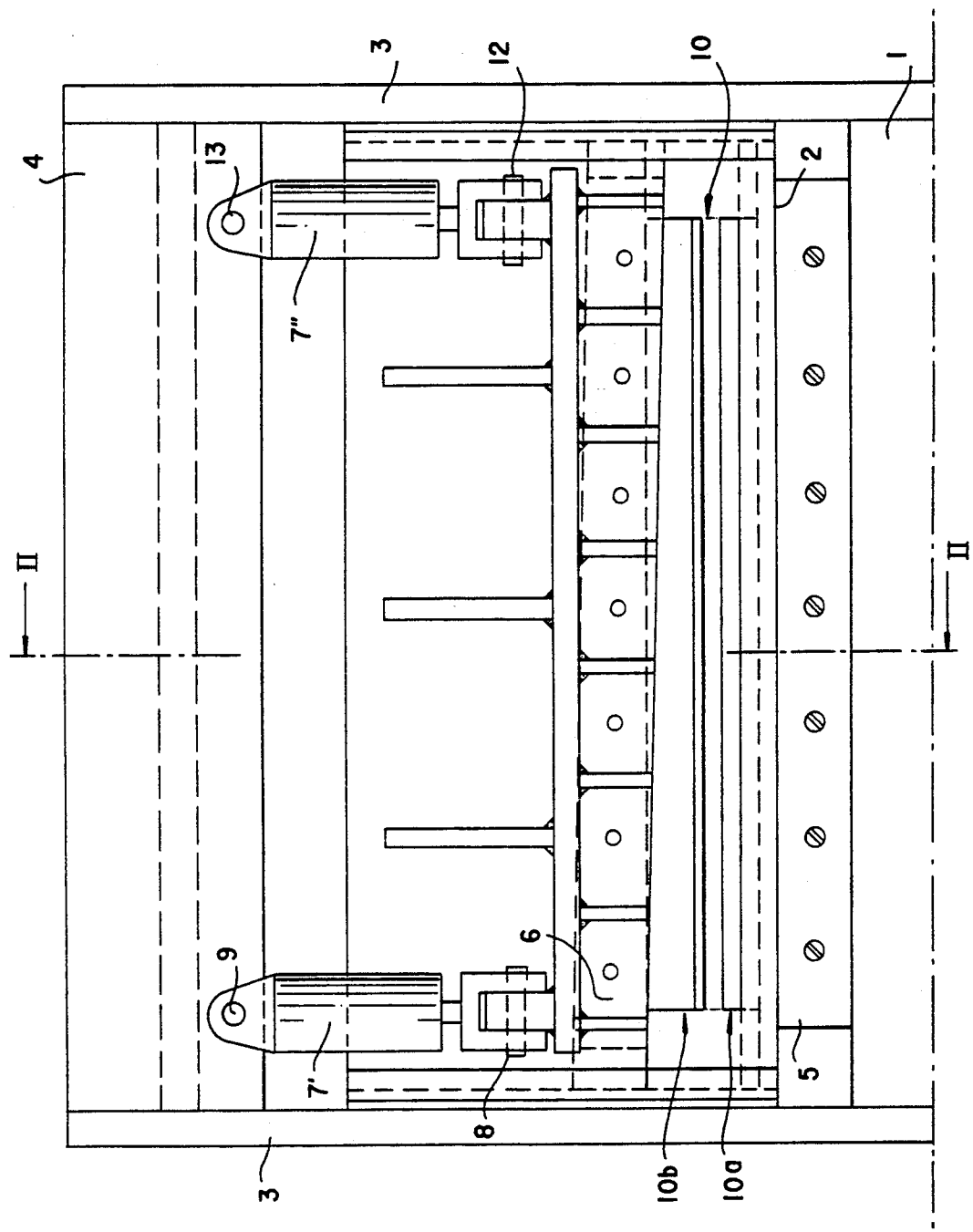
FIG. 1 is a rear elevational view of the power shear machine of this invention.
Figure 2:
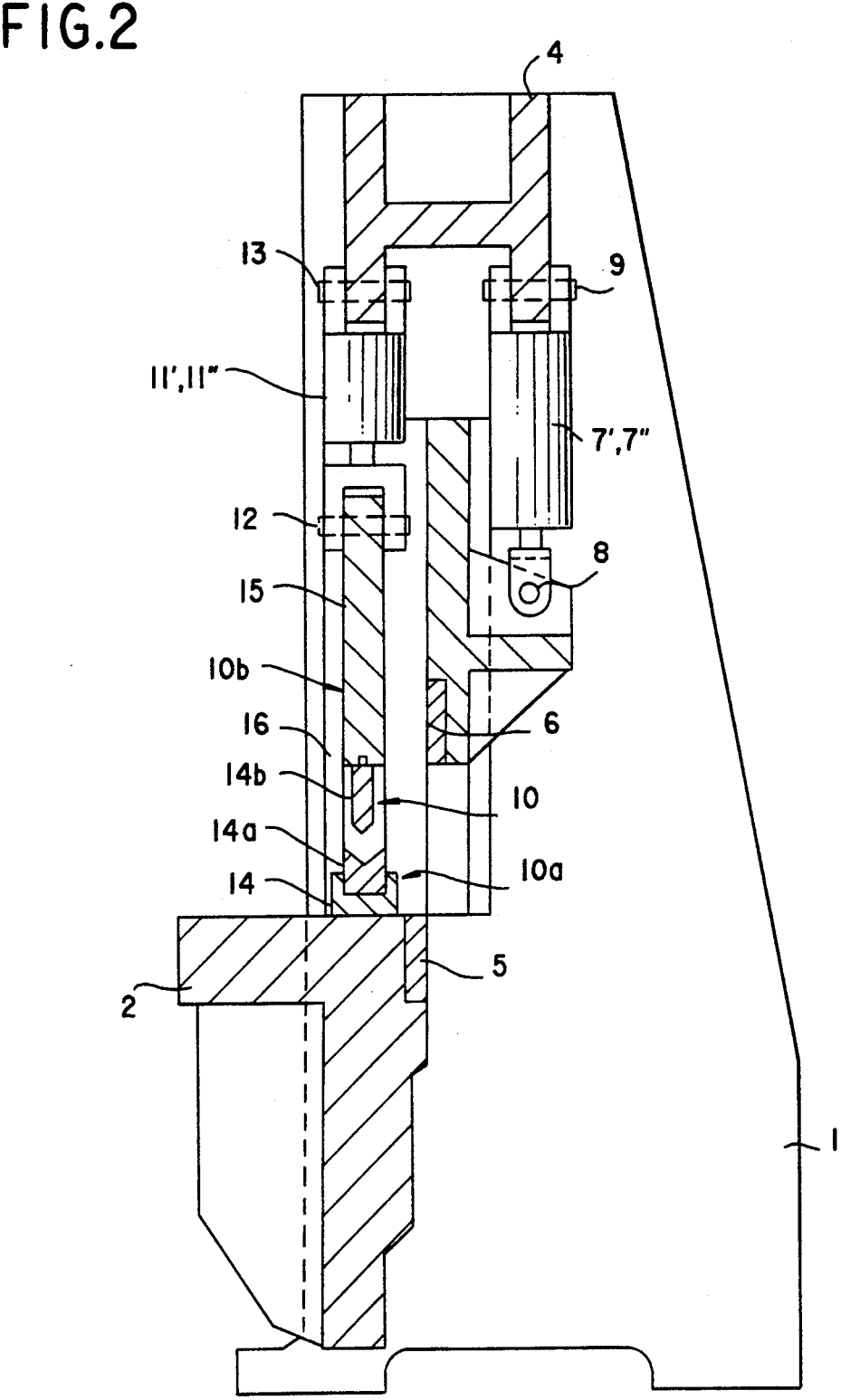
FIG. 2 is a cross-sectional view taken along line II—II of FIG. 1.

The power shear machine of this invention, includes a base 1 which is machine surfaced on an upper face and a side in order to form a table base 2 and a cross-beam 4, both secured between two side members 3 so as to form a part of a power shear machine frame.

The shear proper is made of a bottom blade 5 bolted horizontally on the back side of a table base 2, and a top blade 6 that slides vertically between the two side members 3. Top blade vertical displacements are controlled by two vertical cylinders 7', 7" mounted near the two side members 3 and are articulated at their anchor points 8, 9 with top blade 6 and cross-beam 4. The rack or top blade angle relative to the horizontal is determined according to a range of material thicknesses, material alloys and desired quality of cut the shear is designed to accommodate. Depending upon manufacturers of conventional shears, this rack angle is either readjustable or not. The same design parameters and consideration of manufacturer apply for blades clearance or distance separating the two blades of a shear that can also be adjustable or not. However, the two above-described optional capabilities being not particularly pertinent to the present invention, the embodiment (herein described and illustrated) features non-adjustable rack and non-adjustable clearance capabilities. However, this invention is not limited to any combination of two of the above-described capabilities, and the power shear can, for example, feature a non-adjustable rack angle with an adjustable clearance capability, all depending upon selected design parameters.

However, a hold-down assembly 10 can vertically slide between the two side members 3 in front of top blade 6, and thus on top of the table base 2. Hold-down vertical displacements are controlled by two vertical cylinders 11', 11" mounted near the two side members 3 and articulated at their anchor points 12, 13 with the upper part of hold-down 10 and cross-beam 4.

In this invention, the hold-down assembly 10 is made of two separate parts 10a, 10b both sliding on the same grooves of side members 3. The bottom part 10a of the hold-down assembly 10 is the hold-down proper 14 which is a U-shaped horizontal beam in which a tool 14a is inserted. The tool 14a, as illustrated, is a female forming die featuring a longitudinal V-shaped groove on its top face and on its center. Hold-down upper part 10b made of the hold-down platen 15, where the two cylinders 11', 11" are anchored, features a longitudinal groove on a center portion of its bottom side in order to be inserted and fastened by means of screws 16, a male forming die 14b complementary shaped to a female die 14a configuration.

Figure 3:
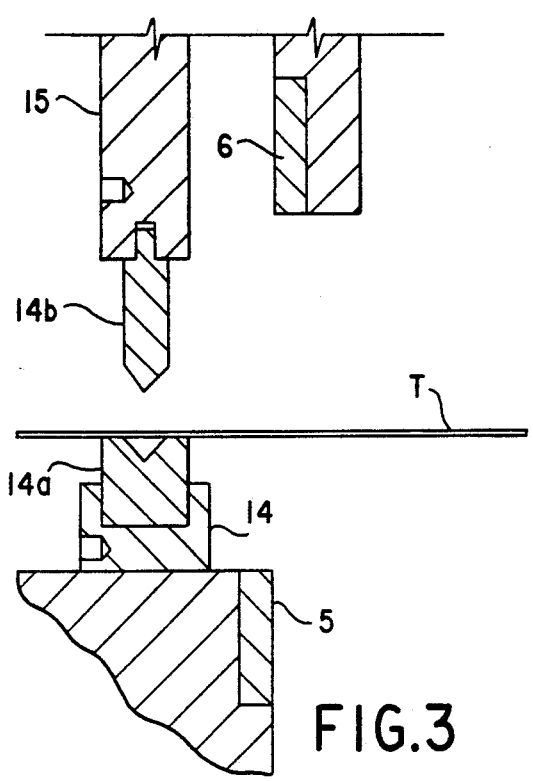
FIGS. 3 to 6 are partial enlarged sections schematically illustrating the subject matter of FIG. 2.
Figure 4:
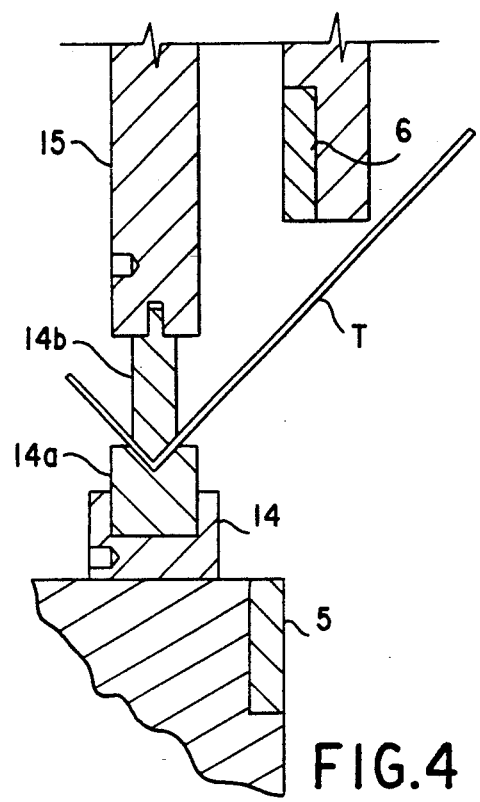

As schematically shown in FIG. 3 and 4, with the hold-down bottom part 10a of hold-down assembly 10 seated on the table base 2, and with both hold-down upper part 10b and top blade 6 moved up, a sheet of material T can be seated on top of bottom part 10a of hold-down 10. With the tip of male die tool 14b being exactly in line with the female die tool 14a groove center, the down motion of hold-down platen 15 induced by cylinders 11', 11" brings the tip of male die tool 14b in contact with the sheet of material T exactly in the center between the two corners of female die tool 14a groove. Provided that the force exerted by the cylinders is greater than the material T bending strength, any further down motion by the male die tool 14b past a point of contact induces material T to deform. An angle of deformation is therefore a function of how far down the male die tool 14b is driven past a point of contact with material T for a maximum deformation to occur when male die tool 14b bottoms out, as shown in FIG. 4.

Figure 5:
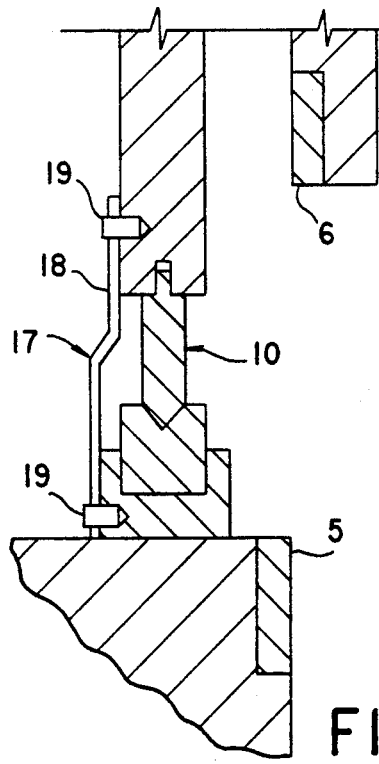
Figure 6:
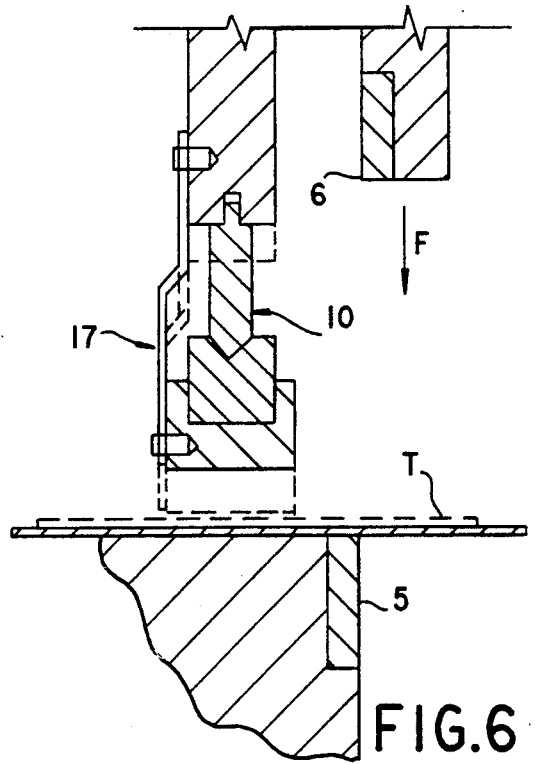

Furthermore, as shown in FIGS. 5 and 6, with hold-down bottom part 10a being seated on table base 2 and material T being removed, the upper part 10b can be lowered until the two are in contact with each other and match, as shown in FIG. 5, and temporarily secured together by means of two locking tools 17 inserted at their ends. Locking tools 17 are made of a flat bar 18 shaped to match the hold-down two-part configuration, equipped with protruding studs 19 at each end, and perpendicular to their faces. Corresponding holes being provided at each end of the two hold-down parts 14, 15, the locking tool studs 19 can be inserted into the above-described holds in order to secure the two hold-down parts 14, 15 together so as to form hold-down assembly 10.

Further, in this invention, the two parts of the hold-down being secured together to form one assembly 10, it can be used as a conventional hold-down, as shown in FIG. 6. The assembly can then be raised up above table base 2, allowing for sheet of material T to slide across table base 2 past bottom blade 5. Powering down the hold-down assembly 10 on top of material T, as shown in dotted lines in FIG. 6, puts pressure thereon, and is ultimately held down firmly. The shear can then be activated. The upper blade 6 under action from the cylinders 7 thereof moves down, as shown in arrow F, in order to shear material T along the edge of bottom blade 5.

Figure 7:
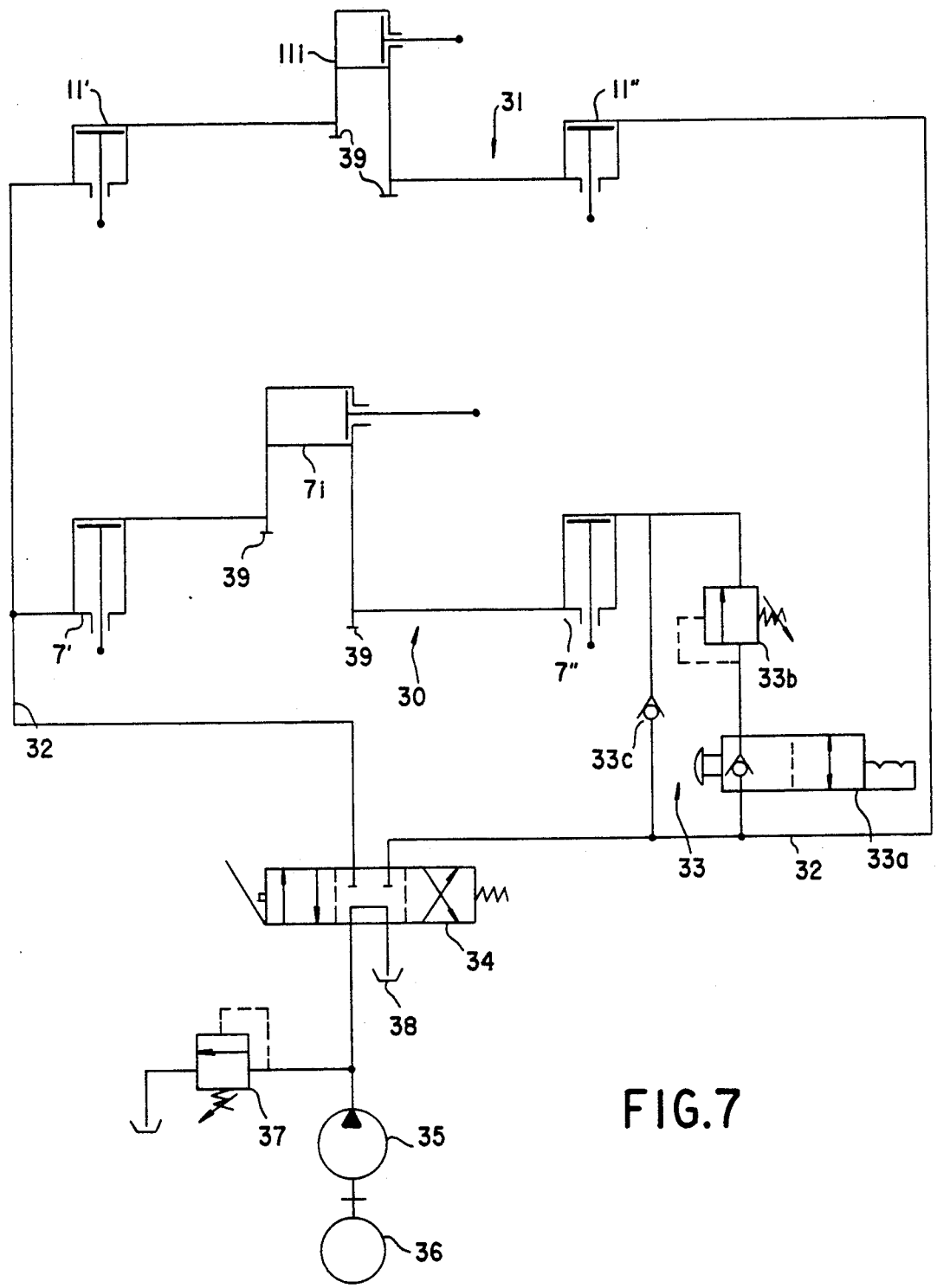
FIG. 7 is a hydraulic circuit diagram of the power shear of this invention.

The purpose of the hydraulic circuitry, represented in FIG. 7 as a diagram, is to power cylinders 7', 7" in order to actuate the shear 5, 6 and to power cylinders 11', 11" so as to actuate the hold-down assembly 10.

As shown in FIG. 7, an intermediary cylinder 7i is interposed between shear cylinders 7', 7" in order to form actuation arrangement 30 of identical double acting cylinders 7', 7i, 7", whereas bottom ports of cylinders 7', 7i, and rod end ports of cylinders 7i, 7" being connected together, all three cylinders 7', 7i, 7" are in series. Similarly, an intermediary cylinder 11i is interposed between hold-down cylinders 11', 11" in order to form actuation arrangement 31 having identical double acting cylinders 11', 11i, 11" also connected in series. Therefore, all three identical cylinders of each actuation arrangement 30, 31 being connected in series, when actuated, move in perfect synchronization with each other; although, both intermediary cylinders 7i, 11i move in the same direction, opposite the moving direction of cylinders 7', 7", 11', 11".

The two actuation arrangements 30, 31 are connected in parallel within a main circuitry 32, with the interposition of a hydraulic selector 33 between shear actuation arrangement 30 and main circuitry 32. A four-way three-position directional control main valve 34 is interposed between both ends of main circuitry 32 and pump 35 powered by motor 36. A poppet relief valve 37 mounted perpendicular to a pump line protects hydraulic components and the pump against pressure surge.

Main valve 34 is foot-operated wherein a spring returns to its center position, as shown in FIG. 7, where pump flow is returned to the tank and where both ends of the main circuitry 32 are closed. Specific foot commands on the valve stem shift the valve spool position from center to either two actuating positions. In one of these actuating positions, shown left of the center position in FIG. 7, pump flow is directed to the left side of the main circuitry 32 to cylinders 7', 11', and in the position shown right of the center position, pump flow is directed to the right side of the main circuitry 32 to cylinder 11" and provided hydraulic selector 33 condition allows the flow to cylinder 7". Left position configuration, as shown in FIG. 7, corresponds to the rising up of the hold-down and shear, while the right position corresponds to their descents.

Hydraulic selector 33 includes a hand-operated two-way poppet valve 33a mounted in series with a pressure controlled valve 33b, adjusted to open at preselected pressure, to provide desired hold-down 10 force. Further, a poppet check valve 33c mounted in parallel with valves 33a, 33b and mounted in series, between cylinder 7" port line and main circuitry 32, restricts pump flow.

The replenishment of leakage through cylinder rings and seals are provided by four replenishing valves 39 mounted at each actuation arrangement 30, 31 on each side of each of the intermediary cylinders 7i, 11i, respectively. The replenishing valves 39 which are either automatic or manual, depending upon intended use of the power shear machine, are used after each cylinder stroke when automatic or at regular intervals, if manual. Also, with automatic replenishing valves 39, standard, inexpensive agricultural type cylinders can be used for all cylinders in this circuitry.

The operation of the above-described hydraulic system of this invention is hereinafter described.

With a closed condition existing at hydraulic selector 33, as illustrated in FIG. 7, shear actuation arrangement 30 is isolated from main circuitry 32 due to the outcome of the change of position of the main valve 34. In this closed condition at hydraulic selector 33, only the hold-down 10 actuation arrangement 31 can be directed by main valve 34 so as to move in either direction. Depending upon which right or left position the main valve 34 spool is pushed to, cylinders 11', 11" do, respectively, push down or pull up the hold-down 10, and if locking tools 17 have been removed, the machine can be used as a forming press, as described heretofore with respect to FIGS. 3 and 4.

For the machine to be in a shear mode, as illustrated in FIGS. 5 and 6, the two-part hold-down are first locked together by means of locking members 17, and as hold-down assembly 10 is returned to its upper position, poppet valve 33a of hydraulic selector 33 is manually shifted to its right position; thus, changing the hydraulic selector 33 condition from closed to open, and the machine is now in shear mode and ready to operate.

Upon shifting of main valve 34 spool to the right position, pump flow is directed at hold-down actuation arrangement 31, and through opened valve 33a to pressure valve 33b that is closed. The line pressure which is required to lower hold-down assembly 10 to less than the pressure setting of the pressure valve 33b remains closed while hold-down assembly 10 is lowered down by cylinders 11', 11" upon making contact with the material to be sheared. Also, line pressure builds up as hold-down cylinders 11', 11" exert more force, with line pressure at pressure setting, so that pressure valve 33b opens; thereby, letting pump flow through to reach cylinder 7". Shear actuation arrangement 30 is thus activated and shear top blade 6 is lowered down by cylinders 7', 7", while adequate holding force is maintained at hold-down cylinders 11', 11".

The return of the shear blade and the hold-down assembly to their up positions occurs when main valve 34 spool is shifted to the left, directing pump flow to the left side of the main circuitry 32, while draining the right side to the tank 38, and making the line pressure to drop and causing pressure valve 33b to close. Return oil from cylinder 7" is then drained to tank by way of poppet check valve 33c and main valve 34.

As discussed above, the intermediary cylinders 7i, 11i which direction of displacement is opposite to those of cylinders 7', 7", 11', 11" can be utilized so as to power other operations of the fabrication process.

It is clear that although the above description contains. a detailed description of the preferred embodiments, many various specific modifications can encompass the embodiments and their functions, as well as the hydraulic circuitry and components thereof, while remaining within the framework of the invention. Thus, forming tools 14a and 14b can be replaced with other ones to notch, bend, punch or stamp or the like. Either the male tool or the female tool can be inserted into the hold-down bottom part 14, and the other one secured on the upper part 15.

Furthermore, the above-described locking means 17, to temporarily lock and unite the two hold-down parts 14, 15, can be replaced by other locking means, whereas for example, bottom part 14 can be powered by two hydraulic cylinders or air cylinders or screw actuators mounted between the two hold-down parts, outside the two tools 14a, 14b. Upon actuation, the cylinders or actuators being anchored at one end to hold-down platen 15 and at the other end to bottom part 14, lift and secure female tool 14a onto male tool 14b, for the machine to be used as a conventional shear. For the machine to be used for other operations, the two cylinders or actuators only need to be disengaged from either of the two hold-down parts so that bottom part 14 remains seated on table base 2, while the upper part is lifted-up.

The disclosed embodiments exemplify the invention in what is presently considered the best mode of operation for the purpose of illustration, recognizing of course that the invention may be embodied in various other forms some of which may be radically different from the illustrative embodiment. However, the specific structural and functional details disclosed herein are representative and provide a basis for the claims herein which define the scope of the present invention.

While the invention has been particularly shown and described in reference to preferred embodiments thereof, it will be understood by those skilled in the art that changes in form and details may be made therein without departing from the spirit and scope of the invention.

What is claimed is:

1. A convertible sheet metal and plate power shear machine, comprising:
    a machine-surfaced table base (2) having a rear side and parallel side, edges, upstanding side members attached to each of said parallel side edges and a top cross beam (4) secured between said upstanding two side members (3);
    a shear having a bottom blade (5) bolted to said rear and side of said machine-surfaced table base (2) cooperating with a top blade (6) capable of vertical sliding displacements by sliding through a first pair of vertical grooves provided on facing portions of said side members (3);
    a hold-down (10) capable of vertical displacements in front of said top blade (6) and overlaying said table base (2) through a second pair of vertical grooves on said facing portions of said side members (3); and
    means (7', 7", 11', 11") for controlling said top blade (6) and said hold-down (10) to slide up and down independently of each other,
    wherein said hold-down (10) includes two separable top and bottom parts (10a, 10b) each supporting, on a face thereof, at least one cooperating tool (14a, 14b) for performing forming and machining operations and a means for temporarily locking together said separate parts (10a, 10b) of said hold-down (10), and for allowing said hold-down (10) to apply a hold-down force on a part to be sheared by said shear.

2. A machine according to claim 1, wherein at least one of said tools of said hold-down (10) is a male forming, punching, notching, bending and stamping die, and another is a complementary female die.

3. A machine according to claim 2, wherein said female die (14a) is inserted on top of said bottom part (10a) of said hold-down (10), and said male die (14b) is fastened to said top part (10b) of said hold-down (10).

4. A machine according to claim 1, wherein said means for temporarily locking together both parts (10a, 10b) of said hold-down (10) include at least two locking members (17), wherein each includes protruding studs to be inserted into corresponding holes provided respectively at each of the two hold-down parts (10a, 10b) of said hold-down (10).

5. A machine according to claim 1, wherein said means for controlling said top blade (6) and hold-down (10) to slide up and down include hydraulic cylinders (7', 7", 11', 11"), respectively.

6. A machine according to claim 5, wherein said hydraulic cylinders (7', 7", 11', 11") are powered by a hydraulic pump (35).

7. A machine according to claim 1, wherein said means for controlling said top blade and hold-down includes actuation arrangements (30) and (31) including, respectively, a pair of cylinders (7', 7") for the shear and a pair of cylinders (11', 11") for the hold-down (10).

8. A machine according to claim 7, wherein said actuation arrangements (30, 31) are connected in parallel within a main circuitry (32), with a hydraulic selector (33) being interposed in between one side of said main circuitry (32) and top blade actuation arrangement (30).

9. A machine according to claim 8, wherein said hydraulic selector (33) includes a poppet two-way valve (33a) mounted in series with a pressure valve (33b) adjusted to open at a pre-selected line pressure to control hold-down force, and a poppet check valve (33c) mounted parallel to said poppet two-way valve (33a) and said pressure valve (33b).

10. A machine according to claims 7, 8 or 9, wherein a main valve (34) being interposed between said pump (35) and said main circuitry (32) direct pump flow to either end of said main circuitry (32) or to a tank (38).

11. A machine according to claims 7, 8 or 9, wherein a relief valve (37) is mounted proximate said hydraulic pump (35) on an outflow line thereof.

12. A machine according to claim 7, wherein said actuation arrangements (30, 31) are connected in parallel within a main circuitry (32), with hydraulic selector (33) being interposed in between one side of said main circuitry (32) and shear actuation arrangement (30).

* * * * *